(12) United States Patent
Koneru et al.

(10) Patent No.: US 12,135,945 B2
(45) Date of Patent: Nov. 5, 2024

(54) SYSTEMS AND METHODS FOR NATURAL LANGUAGE PROCESSING USING A PLURALITY OF NATURAL LANGUAGE MODELS

(71) Applicant: Kore.ai, Inc., Orlando, FL (US)

(72) Inventors: Rajkumar Koneru, Windermere, FL (US); Prasanna Kumar Arikala Gunalan, Hyderabad (IN); Thirupathi Bandam, Hyderabad (IN); Girish Ahankari, Hyderabad (IN)

(73) Assignee: Kore.ai, Inc., Orlando, FL (US)

( * ) Notice: Subject to any disclaimer, the term of this patent is extended or adjusted under 35 U.S.C. 154(b) by 373 days.

(21) Appl. No.: 17/539,059

(22) Filed: Nov. 30, 2021

(65) Prior Publication Data

US 2023/0169273 A1    Jun. 1, 2023

(51) Int. Cl.
*G10L 15/22* (2006.01)
*G06F 40/35* (2020.01)
*G06N 3/006* (2023.01)

(52) U.S. Cl.
CPC ............. *G06F 40/35* (2020.01); *G06N 3/006* (2013.01)

(58) Field of Classification Search
CPC ......... G06F 40/35; G06F 40/30; G06N 3/006; G06N 20/00; G10L 14/18; G10L 15/22
See application file for complete search history.

(56) References Cited

U.S. PATENT DOCUMENTS

| | | | |
|---|---|---|---|
| 8,265,939 B2 | 9/2012 | Kanevsky et al. | |
| 8,346,563 B1 * | 1/2013 | Hjelm | G10L 15/1822 704/251 |
| 10,482,184 B2 | 11/2019 | Gelfenbeyn et al. | |
| 10,733,538 B2 | 8/2020 | Singaraju et al. | |
| 10,762,113 B2 * | 9/2020 | Jia | G10L 15/193 |
| 11,442,992 B1 * | 9/2022 | Moon | G06N 20/00 |
| 2014/0272821 A1 * | 9/2014 | Pitschel | G06F 40/58 434/157 |

(Continued)

FOREIGN PATENT DOCUMENTS

CN      112101044 A      12/2020

OTHER PUBLICATIONS www.docs.aws.amazon.com. Nov. 19, 2020. Setting Intent Context—Amazon Lex. [online] Available at: <https://docs.aws.amazon.com/lex/latest/dg/context-mgmt-active-context.html> [Accessed Jun. 30, 2021].

(Continued)

*Primary Examiner* — Abul K Azad
(74) *Attorney, Agent, or Firm* — Troutman Pepper Hamilton Sanders LLP

(57) ABSTRACT

A virtual assistant server receives an utterance provided by an end user via a channel of a virtual assistant rendered in a client device. The virtual assistant server identifies a current-node of execution from a plurality of nodes of a conversation definition of the virtual assistant and identifies a first set of language models from a group of language models of the virtual assistant to interpret the utterance. Further, the virtual assistant server executes the first set of language models in an order based on the current-node until an intent of the utterance is determined. Subsequently, the virtual assistant server generates a response based on the intent and outputs the response to the client device.

21 Claims, 11 Drawing Sheets

(56) References Cited

U.S. PATENT DOCUMENTS

| | | |
|---|---|---|
| 2019/0325081 A1 | 10/2019 | Liu et al. |
| 2020/0193447 A1 | 6/2020 | Jaiswal et al. |
| 2020/0342175 A1* | 10/2020 | Gadde ................. G06F 16/3329 |
| 2020/0365155 A1* | 11/2020 | Milden ................... G06F 3/167 |
| 2021/0004443 A1 | 1/2021 | Sapugay et al. |

OTHER PUBLICATIONS www.cloud.ibm.com. Last updated—Mar. 2019. How your dialog is processed. [online] Available at: <https://cloud.ibm.com/docs/assistant?topic=assistant-dialog-build> [Accessed Jul. 1, 2021].
www.cloud.ibm.com. Oct. 6, 2020. Controlling the dialog flow. [online] Available at: <https://cloud.ibm.com/docs/assistant-data?topic=assistant-data-dialog-runtime#dialog-runtime-digression-tutorial> [Accessed Jul. 7, 2021].

* cited by examiner

| Order of execution of the first set of LM's identified by the virtual assistant server | |
|---|---|
| 1) Current-node LM's | 1.a) one or more LM's associated with the current-node |
| | 1.b) one or more LM's associated with the group of nodes that the current-node is a part of |
| | 1.c) one or more LM's associated with the current-node intent |
| | 1.d) one or more LM's associated with the group of intents that the current-node intent is a part of |
| 2) Global LM's | one or more LM's of the virtual assistant |
| 3) Peripheral LM's | one or more peripheral LMs including - small talk LM's, channel-based LM's |

FIG. 7B

SYSTEMS AND METHODS FOR NATURAL LANGUAGE PROCESSING USING A PLURALITY OF NATURAL LANGUAGE MODELS

FIELD

This technology generally relates to systems, methods, and non-transitory computer readable media for natural language processing using a plurality of natural language models.

BACKGROUND

Most of the virtual assistants implemented by enterprises currently are not sophisticated and are designed using rigid decision trees. An increased focus on automation and the improvement in machine learning algorithms, advanced natural language processing, and other related technologies has led to increased virtual assistant capabilities resulting in large scale and growing enterprise adoption of virtual assistants. In particular, enterprises are increasingly using virtual assistants to automate interactions with end users. However, with this increased adoption by enterprises, end users are expecting a human-like conversation with a virtual assistant. Accordingly, even with the increased focus discussed above, meeting this expectation is challenging, as understanding the natural language used by humans is complex.

By way of example, natural language used by humans includes complexities such as—multiple intents, change of tense, ambiguous words, same words with varying meanings, contextual words and sentences, or the like. As a result, comprehensively understanding natural language requires understanding words and connected concepts in utterances provided by end users to virtual assistants.

To gain this comprehensive understanding, detection of user intent in an utterance received from an end user is a key feature of virtual assistants. In particular, when attempting to detect user intent, existing virtual assistants have traditionally followed a linear, predefined conversation paths and have not adequately supported variations from these linear defined paths. Additionally, existing virtual assistants have lacked advanced intent detection when the conversation includes—switching intents, context-based utterances, or the like, and as a result—have failed to meet user expectations or resolve user issues. This leads to frustration among end users, reduces adoption of virtual assistant channels, reduces brand satisfaction, and increases end user retention costs for enterprises.

SUMMARY

An example natural language processing method includes receiving, by a virtual assistant server, an utterance provided by an end user via a channel of a virtual assistant rendered in a client device. The virtual assistant server identifies a current-node of execution from a plurality of nodes of a conversation definition of the virtual assistant. The virtual assistant server also identifies a first set of language models from a group of language models of the virtual assistant based on the current-node to interpret the utterance. The first set of language models are executed in an order based on the current-node until an intent of the utterance is determined. The virtual assistant server generates a response based on the intent and outputs the response to the client device.

In another example, a virtual assistant server comprises a processor and a memory coupled to the processor which is configured to be capable of executing programmed instructions stored in the memory to: receive an utterance provided by an end user via a channel of a virtual assistant rendered in a client device, and identify a current-node of execution from a plurality of nodes of a conversation definition of the virtual assistant. A first set of language models are identified from a group of language models of the virtual assistant based on the current-node to interpret the utterance. The first set of language models are executed in an order based on the current-node until an intent of the utterance is determined. A response based on the intent is generated and output to the client device.

In another example, a non-transitory computer-readable medium having stored thereon instructions for enabling and orchestrating enterprise automation which when executed by a processor, causes the processor to: receive an utterance provided by an end user via a channel of a virtual assistant rendered in a client device, and identify a current-node of execution from a plurality of nodes of a conversation definition of the virtual assistant. A first set of language models are identified from a group of language models of the virtual assistant based on the current-node to interpret the utterance. The first set of language models are executed in an order based on the current-node until an intent of the utterance is determined. A response based on the intent is generated and output to the client device.

BRIEF DESCRIPTION OF THE DRAWINGS

FIG. 7B illustrates a table including an example order of execution of a first set of language models identified by the virtual assistant server to interpret a second utterance.

DETAILED DESCRIPTION

Figure 1:
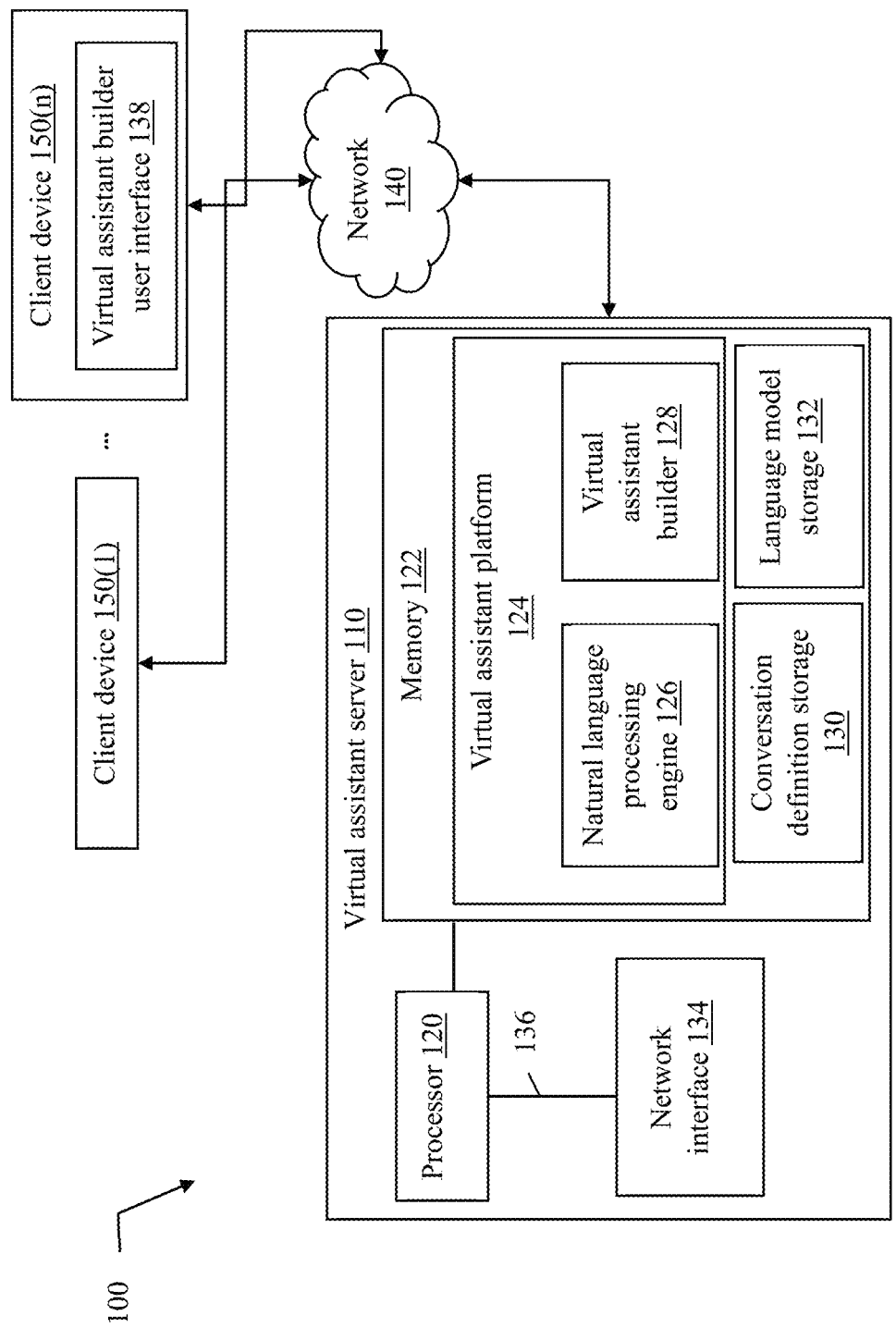
FIG. 1 is a block diagram of an exemplary environment with an example of a virtual assistant server configurable to orchestrate natural language conversations.
Figure 3:
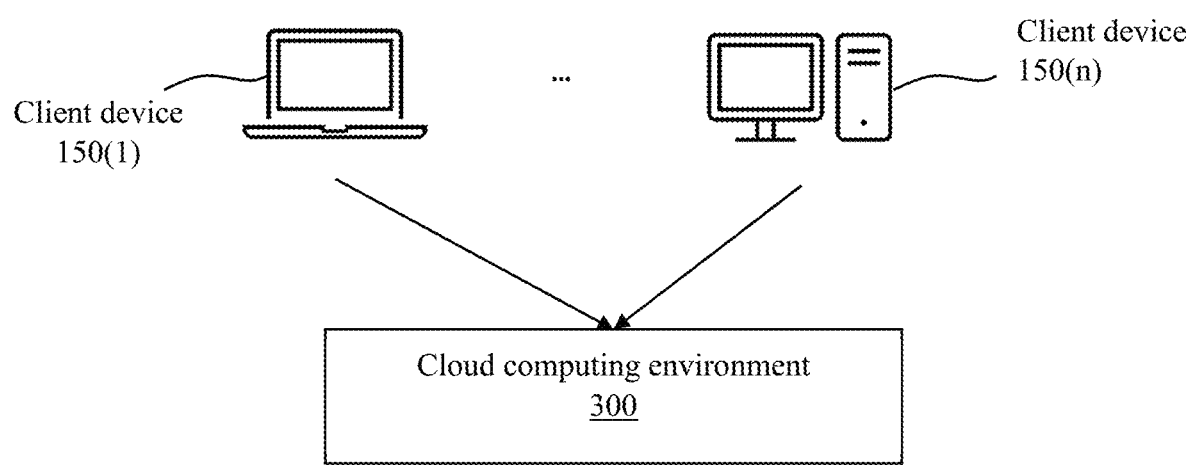
FIG. 3 is a block diagram of an example cloud computing environment which may be used to implement the virtual assistant server.

Examples of this technology relate to using natural language models for interpreting and responding to utterances received from client devices and, more particularly, to one or more components, systems, non-transitory computer readable media and methods of a virtual assistant server configured to orchestrate natural language conversations. The virtual assistant server is configured to receive utterances from client devices and output responses corresponding to the utterances to the client devices based on one or more conversation definitions. In other examples, the one or more components, systems, non-transitory computer readable media, and methods may enable the design and development of virtual assistants. FIG. 1 is a block diagram of an exemplary environment 100 with an example of a virtual assistant (VA) server 110 configurable to orchestrate natural language conversations. The environment 100 also includes one or more client devices 150(1)-150(n) and a network 140, although other types and/or numbers of components, systems, or devices in other configurations may be included. The VA server 110 may include a processor 120, a memory 122, and a network interface 134, although the virtual assistant server 110 may include other types and/or numbers of components or other elements in other configurations. In addition, the VA server 110 may include an operating system (not shown). The VA server 110 and/or processes performed by the VA server 110 can be integrated into a networking environment (e.g., cloud environment), such as shown in FIG. 3 or any enterprise management system, development tool or other systems. In one example, the VA server 110 may include the Kore.ai 'No-code' Platform.

The processor 120 may comprise one or more central processing units, or general-purpose processors with one or more processing cores, such as Intel® processor(s), AMD® processor(s), although other types and/or numbers of processor(s) could be used in other configurations. The processor 120 executes one or more instructions as illustrated and described by way of the examples herein which can be stored in the memory 122. By way of example, the processor 120 may fetch the instructions from a register (not shown), a cache (not shown), or the memory 122. The processor 120 may execute the fetched instructions and write the results to the register, the cache, or the memory 122. It may be understood that the processor 120 may include any types and/or numbers of registers or caches.

The memory 122 is an example of a non-transitory computer readable storage medium capable of storing information or instructions for the processor 120 to operate on. The instructions, which when executed by the processor 120, perform one or more of the illustrated and disclosed examples. In one example, the memory 122 may be a random access memory (RAM), dynamic random access memory (DRAM), static random access memory (SRAM), a persistent memory (PMEM), a nonvolatile dual in-line memory module (NVDIMM), hard disk drive (HDD), read only memory (ROM), erasable programmable read-only memory (EPROM), electrically erasable programmable read-only memory (EEPROM), programmable ROM (PROM), flash memory, a CD, a DVD, a magnetic disk, a USB memory card, a memory stick, or a combination of two or more of these. It may be understood that the memory 122 may include other electronic, magnetic, optical, electromagnetic, infrared or semiconductor based non-transitory computer readable storage medium which may be used to tangibly store instructions, which when executed by the processor 120, perform one or more of the disclosed examples. The non-transitory computer readable medium is not a transitory signal per se, and is any tangible medium that contains and stores the instructions for use by or in connection with an instruction execution system, apparatus, or device.

The memory 122 comprises a virtual assistant platform 124, a conversation definition storage 130, and a language model storage 132, although the memory may comprise other types and/or numbers of other programmed instructions. The virtual assistant platform 124 includes a natural language processing (NLP) engine 126 and a virtual assistant builder 128, although the virtual assistant platform 124 may include other types and/or numbers of programmed instructions or other elements in other configurations. Examples of the programmed instructions and steps stored in the memory 122 are illustrated and described by way of the figures and description associated with the examples herein. As illustrated in FIG. 1, the virtual assistant platform 124 includes instructions corresponding to the NLP engine 126 and the virtual assistant builder 128, although other types and numbers of instructions in the form of programs, functions, methods, procedures, definitions, subroutines, or modules, may be stored in the virtual assistant platform 124.

The virtual assistant platform 124 creates and stores a conversation definition for each virtual assistant created using a virtual assistant builder UI 138. The conversation definition may be created and/or modified based on a configuration of the virtual assistant created using a virtual assistant builder UI 138. The conversation definition may include code or instructions corresponding to the virtual assistant, in the form of programs, functions, methods, procedures, subroutines, or the like. In one example, the conversation definition may be in the form of database tables, JavaScript Object Notation (JSON) files, extensible markup language (XML) files, or other such data structures. When an end user interacts with the virtual assistant, the virtual assistant platform 124 may access the conversation definition of the virtual assistant at runtime and provide responses to the end user interacting with the virtual assistant based on the conversation definition.

The conversation definition may also include metadata of the virtual assistant created using the virtual assistant builder UI 138 such as virtual assistant name, intent names of the virtual assistant, node names of the intents, node transitions, interruption behavior of the virtual assistant, entity names, entity settings, entity prompts to be sent by the virtual assistant to the one or more client devices 150(1)-150(n), code and/or data of API configurations, information retrieval settings from internal or third-party databases, third party integrations, API call configurations, although other types and/or numbers of metadata or configurations may be defined. Example virtual assistants created using the virtual assistant builder UI 138 are illustrated in FIGS. 2B, 2C, 5, and 7A. The components, conversation definitions, engines, or instructions of the virtual assistant platform 124 may communicate with each other to determine a response to the utterances received from one or more client devices 150(1)-150(n). The VA server 110 may store runtime execution information of the conversation definition including a current-node of execution, a context object that persists data for dialog execution such as the name of the intent identified, entities extracted, or the like, although other types and/or numbers of information may be stored.

The NLP engine 126 may incorporate technologies or capabilities including—machine learning, semantic rules, component relationships, neural networks, rule-based engines, or the like. The NLP engine 126 may interpret inputs such as utterances received from end users operating the one or more client devices 150(1)-150(n), and generate responses to the inputs. The NLP engine 126 identifies intents and/or entities from the utterances. The intent of the utterance refers to the intention of the end user—that describes what the user wants the virtual assistant to do. The entities are, for example, parameters, fields, data, or words required by the virtual assistant to fulfill the intent. For example, in the utterance—"Book me a flight to Orlando for next Sunday", the intent is "Book flight", and the entities are "Orlando" and "Sunday." A sub-intent may be used for further categorizing intents. In one example, sub-intents— "get weather", "change travel details" may be associated with the "book flight" intent. It may be understood that sub-intents are also intents and may be associated with one or more: intents, nodes, group of nodes, or group of intents defined in the virtual assistant.

The NLP engine 126 also creates and executes language models (LM's) to interpret the utterances based on the configuration and/or training added using the virtual assistant builder 128. Also, the NLP engine 126 may include one or more pre-defined and/or custom-trained LM's. The NLP engine may create LM's for: a virtual assistant to categorize an utterance into one of the intents of the virtual assistant, sub-intents defined in the virtual assistant, follow-up intents defined in the virtual assistant, although other types and/or numbers of LM's may be created in other configurations. The sub-intents may be associated with intents of the virtual assistant, a group of intents defined in the virtual assistant, nodes of the intents, or a group of nodes defined in the intents, although other types and/or numbers of associations may be made in other configurations. The LM's may include rule-based models, predictive models, or artificial intelligence based models used to interpret an utterance. The NLP engine 126 may create LM's including machine learning models, rule-based models, neural network based models, semantic models, component relationship based models, although other types and/or numbers of models may be created in other configurations.

The virtual assistant builder 128 of the virtual assistant platform 124 may be served from and/or hosted on the VA server 110 and may be accessible as a website, a web application, or a software-as-a-service (SaaS) application. Enterprise users, such as a developer or a business analyst by way of example, may access the functionality of the virtual assistant builder 128, for example, using web requests, application programming interface (API) requests, or the like. The enterprise users may design, create, or train virtual assistants using the virtual assistant builder UI 138 provided by the virtual assistant builder 128. In one example, the functionality of the virtual assistant builder 128 may be exposed as the virtual assistant builder UI 138 rendered in a web page in a web browser accessible using the one or more client devices 150(1)-150(n) such as a desktop or a laptop. The enterprise users may interact with user interface (UI) components such as windows, tabs, or icons of the virtual assistant builder UI 138 rendered in the one or more client devices 150(1)-150(n) to create virtual assistants.

The enterprise user may use the UI components, code, or a combination of these provided in the virtual assistant builder UI 138 to create and configure virtual assistants. Each virtual assistant may include one or more intents and each intent may be configured using UI components such as nodes. The types of nodes provided by the virtual assistant builder UI 138 include: an intent node, an entity node, a service node, a message node, and/or a confirmation node, although other types and/or numbers of nodes may be added in other configurations. The enterprise user may configure the virtual assistant by connecting and configuring multiple nodes in the virtual assistant builder UI 138.

The natural language processing engine 126 assists the virtual assistant builder 128 with natural language understanding and natural language generation. In other examples, the virtual assistant builder UI 138 provides the enterprise users with a set of development tools to create applications such as process applications, digital applications, data tables, or the like. The virtual assistant builder 128 described herein can be integrated with different application platforms, such as development platforms or development tools or components thereof already existing in the marketplace, e.g., Facebook® Messenger™, Microsoft® Bot Framework™, through plug in architectures by way of example.

The conversation definition storage 130 stores the conversation definitions created by the virtual assistant platform 124. The language model storage 132 stores the language models (LM's) created by the virtual assistant platform 124. The virtual assistant platform 124 modifies the conversation definitions when the corresponding virtual assistant configurations are modified by the enterprise user.

The network interface 134 may include hardware, software, or a combination of hardware and software, providing one or more interfaces for communication between the components illustrated in environment 100. In one example, the network interface 134 may provide interfaces for communication between VA server 110 and the network 140. The network interface 134 may support wired or wireless communication. In one example, the network interface 134 may include a network adapter or a wireless adapter to communicate with the network 140.

A bus 136 provides a communications link between each of the components of the VA server 110. The bus 136 includes hardware, software, or a combination of hardware and software, coupling components of VA server 110 with each other. It may be understood that the VA server 110 may include one or more buses 136. The bus 136 may carry information, determine where the information may be sent, or hold control and timing signals required to coordinate information in the VA server 110, although the bus 136 may perform other types of functions in other configurations. By way of example, the bus 136 may include a graphics bus, a memory bus, an Industry Standard Architecture (ISA) bus, an Extended Industry Standard Architecture (EISA) bus, a Micro Channel Architecture (MCA) bus, a Video Electronics Standards Association (VESA) Local bus, a Peripheral Component Interconnect (PCI) bus, a PCI-Express (PCIe) bus, a serial advanced technology attachment (SATA) bus, a Personal Computer Memory Card Industry Association (PCMCIA) bus, an Small Computer Systems Interface (SCSI) bus, or a combination of two or more of these.

The network 140 may enable external systems or devices to communicate with the VA server 110. The network 140 may include an ad hoc network, an extranet, an intranet, a wide area network (WAN), a virtual private network (VPN), a local area network (LAN), a wireless LAN (WLAN), a wireless WAN (WWAN), a metropolitan area network (MAN), Internet, a portion of the Internet, a portion of the Public Switched Telephone Network (PSTN), a cellular telephone network, a wireless network, a Wi-Fi® network, a WiMAX network, or a combination of two or more such networks. It may be understood that the network 140 may include other types and/or numbers of networks in other topologies or configurations. The network interface 134 may include any appropriate interface to communicate with any of these networks.

The network 140 may also support protocols such as Session initiation protocol (SIP), Hypertext transfer protocol (HTTP), Hypertext transfer protocol secure (HTTPS), Real time transport protocol (RTP), Real-Time Streaming Protocol (RTSP), Real-time Transport Control Protocol (RTCP), Session Description Protocol (SDP), Web Real-Time Communication (WebRTC), Transmission Control Protocol/Internet Protocol (TCP/IP), User Datagram Protocol (UDP), Voice over Internet Protocol (VoW), although other types and/or numbers of protocols may be supported in other topologies or configurations.

The one or more client devices 150(1)-150(n) may communicate with the VA server 110 via the network 140. The one or more client devices 150(1)-150(n) may be a desktop, a laptop, a tablet, a smartphone, although the one or more client devices 150(1)-150(n) may include other such devices in other configurations. The one or more client devices 150(1)-150(n) may include software and hardware capable of communicating with the VA server 110 via the network 140. In one example, the one or more client devices 150(1)-150(n) and the VA server 110 may communicate via one or more API's exposed by the VA server 110. During a conversation with the VA server 110, the end user provides utterances in virtual assistant channels in the one or more client devices 150(1)-150(n). In one example, the one or more client devices 150(1)-150(n) may be used by the enterprise users and/or the end users.

For further illustration, the VA server 110 may be representative of a digital backend as a service (MBaaS), maintained by a service provider. As should be understood by those of ordinary skill in the art, the MBaaS is a model for providing developers with a way to link their applications to backend cloud storage and Application Programming Interfaces (APIs) exposed by backend applications, while providing features such as user management and integration.

Figure 2A:
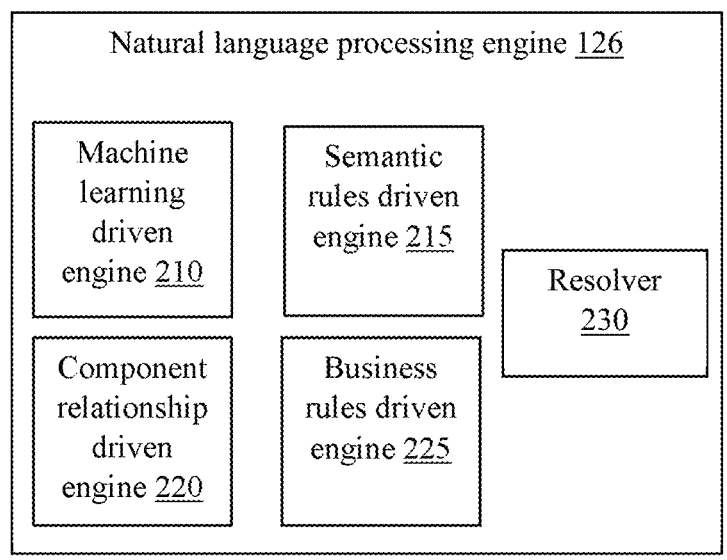
FIG. 2A is a block diagram of an example of components of a natural language processing engine shown in FIG. 1.

FIG. 2A is a block diagram of an example of components of the NLP engine 126 shown in FIG. 1. The VA server 110 inputs the utterances received from the one or more client devices 150(1)-150(n) to the NLP engine 126. In one example, a speech-to-text engine (not shown) and a text-to-speech engine (not shown) may act as communication intermediaries between the one or more client devices 150(1)-150(n) and the VA server 110. The NLP engine 126 parses an utterance received from the one or more client devices 150(1)-150(n) and interprets the utterance to determine an intent of the utterance or an entity in the utterance. The VA server 110 executes the conversation definition of the virtual assistant comprising the determined intent and outputs a response to the utterance. The conversation definition is used by the VA server 110 to determine actions to take in response to utterances or selections provided by the end user.

The NLP engine 126 includes a machine learning driven engine 210, a semantic rules driven engine 215, a component relationship driven engine 220, a business rules driven engine 225, and a resolver 230, although the NLP engine 126 may include other types and/or numbers of engines, programmed components, or other elements in other configurations.

The machine learning driven engine 210 may use machine learning language models to process the utterance and determine an intent and extract one or more entities from an utterance received by the VA server 110. The machine learning driven engine 210 may process the utterance using rules and/or patterns to determine and output an intent name (e.g. of an intent or a sub-intent), a confidence score, and an intent match type, such as definitive match or possible match by way of example, which is output to a resolver 230, although other types of information may be output by the machine learning driven engine 210. The machine learning language models may be trained using utterances provided by the enterprise user, although other methods of training may be used. The machine learning driven engine 210 may use techniques such as conditional random fields (CRF) for named entity recognition (NER) and extraction. Further, the machine learning driven engine 210 may use methods including by way of example n-grams, entity marking, lemmatization, stop word exclusion, word embeddings, or the like to process the utterance before determining intents or entities.

The semantic rule driven engine 215 may determine the intent and extract entities of an utterance received by the VA server 110. The semantic rules driven engine 215 may process the utterance and use rules and/or patterns to determine and output an intent name, a confidence score and an intent match type, such as definitive match or possible match, although other types of information may be output by the semantic rules driven engine 215. The enterprise users may configure the semantic rules in the VA builder user interface 138 using synonyms, patterns, or the like. In one example, the semantic rules driven engine 215 may strip the received utterance to keywords and may use keywords of the utterance or the synonyms of the keywords and rules to identify the intent of the utterance. The semantic rules drive engine 215 may use semantic rules language models to determine the intent of the utterance.

The component relationship driven engine 220 may determine the intent of the utterance received by the VA server 110. In one example, the component relationship driven engine 220 may use a knowledge graph to process the utterance, determine and output an intent name (e.g., a question added to the knowledge graph), a confidence score and an intent match type, such as definitive match or possible match, although other types of information may be output by the component relationship driven engine 220. In one example, the component relationship driven engine 220 may include a knowledge graph defined by the enterprise users that represents relationships, such as a hierarchical relationship between nodes of the knowledge graph by way of example, although other types and/or numbers of relationships may be used. Based on the hierarchy, the nodes may be defined as parent nodes and child nodes, although other types of hierarchical arrangements may be used. Each node in the knowledge graph may include a node name, synonyms to the node name and question-answer pairs. The component relationship driven engine 220 may determine an intent (e.g. a question of the knowledge graph) which matches utterance. The component relationship driven engine 220 may use component relationship language models to determine the intent of the utterance.

The business rules driven engine 225 may determine the intent of an utterance received by the VA server 110. The business rules driven engine 225 may process the utterance using business rules to determine and output an intent name, a confidence score and an intent match type, such as definitive match or possible match, although other types of information may be output by the business rules driven engine 225. The enterprise users may configure the business rules in the VA builder user interface 138 using entities, phrases, attributes or other details. Business rules use specific entities, attributes, words, or phrases in utterances to drive intent detection. An example of a business rule may be—an intent X may be executed when the received utterance includes an "entity 1" and a "phrase 1". Another example of a business rule may be—an intent X may be executed when the received utterance includes a "phrase 1" or a "phrase 2". The business rules driven engine 225 may use such business rules to evaluate the utterances and identify an intent match. In another example, a business rule named—"economy" may be added with utterances such as "low-cost flying", "low-budget travel options." This business rule may be used to trigger an intent with the intent name—"Book flight". The business rules driven engine 225 may use business rule language models to determine the intent of the utterance.

The machine learning driven engine 210, the semantic rules driven engine 215, the component relationship driven engine 220, and the business rules driven engine 225 may output the determined intent names (e.g. of an intent or a sub-intent), the confidence scores, and the intent match types, such as definitive match or possible match by way of example, to the resolver 230. The engines 210, 215, 220, or 225 categorize a matched intent as a definitive match or a possible match based on the confidence scores, although other types and/or numbers of methods may be used for the categorization in other configurations. The matched intent may be categorized as the definitive match if the confidence score is above a threshold and as the possible match if the confidence score is below the threshold. The resolver 230 converts the confidence scores of the determined intents into a common scale and determines a final winning intent. The final winning intent may have the highest confidence score in the common scale. In one example, the machine learning engine 210 may output an intent X as a possible match, and the semantic rules driven engine 215 may output an intent Y as a possible match. The resolver 230 based on the utterance, identifies the final winning intent as either intent X or intent Y. The VA server 110 executes a conversation definition of the virtual assistant comprising the final winning intent and based on the execution outputs a response to the one or more client devices 150(1)-150(n) which provided the utterance. In one example, when at least one of the machine learning driven engine 210, the semantic rules driven engine 215, the component relationship driven engine 220, or the business rules driven engine 225 outputs an intent name as a definitive match, the NLP engine 126 may not use the resolver 230 and may output the intent name identified as the definitive match as the intent matched to the utterance.

Figure 2B:
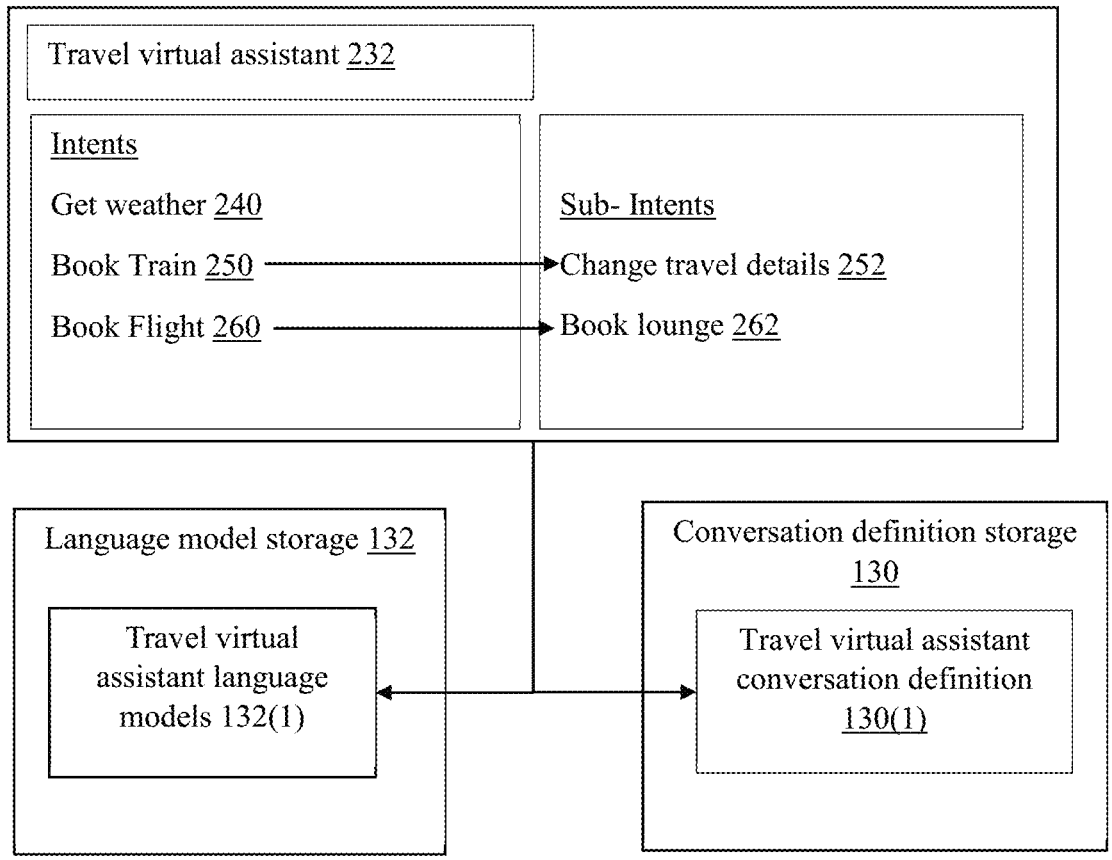
FIG. 2B illustrates exemplary block diagrams of a conversation definition storage, a language model storage shown in FIG. 1, and an exemplary configuration of a travel virtual assistant.

FIG. 2B illustrates exemplary block diagrams of the conversation definition storage 130, the language model storage 132 shown in FIG. 1 and an exemplary configuration of a travel virtual assistant 232. In this example, the travel virtual assistant 232 includes the "get weather" intent 240, "book train" intent 250, and "book flight" intent 260, and the "change travel details" sub-intent 252 and "book lounge" sub-intent 262. The travel virtual assistant 232 may also have been configured with small talk utterances and the corresponding responses. Small Talk may be a casual conversation enabled by a VA server 110 to engage end users. The VA server 110 may create a small talk LM based on the small talk utterances and the corresponding responses. The small talk LM may be responsible to provide responses to end user utterances such as "Hi", "How are you", "thank you", "nice talking to you", or the like, which do not have an intent but are used by end users for greeting or conversation building. The travel virtual assistant 232 may be created and/or configured using the virtual assistant builder UI 138. The VA server 110 may, based on the configuration of the travel virtual assistant 232, create a travel virtual assistant conversation definition 130(1) and store the travel virtual assistant conversation definition 130(1) in the conversation definition storage 130. The VA server 110 may, based on the configuration of the travel virtual assistant 232 and/or training provided to the travel virtual assistant 232, create travel virtual assistant language models 132(1) and store the travel virtual assistant language models 132(1) in the language model storage 132.

The travel virtual assistant conversation definition 130(1) hereinafter referred to as TCD 130(1), may be used to respond to utterances received from end users such as "I would like to book flight tickets", "I would like to travel from Rome to Milan by train. Also, let me know how the weather is in Milan next week", or the like. The TCD 130(1) includes metadata or configuration information corresponding to the "get weather" intent 240, "book train" intent 250, and "book flight" intent 260, the "change travel details" sub-intent 252 and "book lounge" sub-intent 262, small talk, and metadata or configuration information specific to each of the intents 240, 250, and 260 and each of the sub-intents 252 and 262, although other types and/or numbers of information may be included in other configurations. When the VA server 110 determines that the intent of an utterance received from the end user is "book flight" 260, the VA server 110 executes the instructions corresponding to the TCD 130(1), and in particular the instructions corresponding to the "book flight" intent 260 in the TCD 130(1).

Figure 2C:
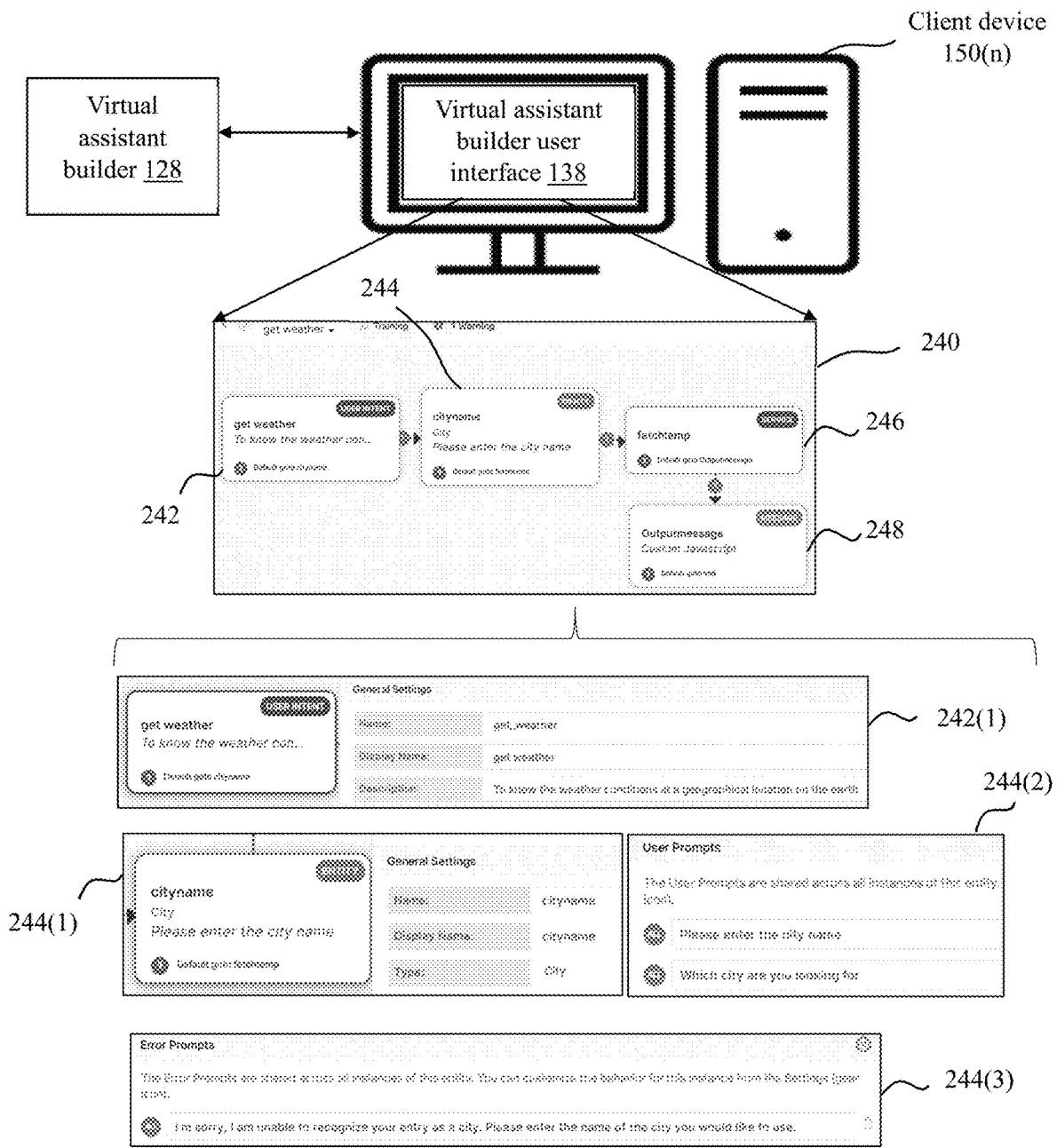
FIG. 2C illustrates screenshots including parts of a get weather intent of the travel virtual assistant created using a virtual assistant builder user interface provided by the virtual assistant server.

FIG. 2C illustrates screenshots including parts of the "get weather" intent 240 of the travel virtual assistant 232 created using a virtual assistant builder UI 138 provided by the VA server 110. In one example, the enterprise user may access the virtual assistant builder UI 138 in the client device 150(n) using a web browser. Although the client device 150(n) is illustrated in this example, it may be understood that the virtual assistant builder UI 138 may be accessed using any of the one or more client devices 150(1)-150(n). The enterprise user may configure the virtual assistant by creating intents and configuring each intent using multiple nodes which are interconnected. The VA server 110 traverses and executes the nodes of an intent in response to the intent being detected in an utterance by the NLP engine 126.

In this example, the "get weather" intent 240 includes an intent node 242, an entity node 244, a service node 246, and a message node 248 connected with each other as illustrated in the FIG. 2C. The enterprise user may select, connect, and/or configure the intent node 242, the entity node 244, the service node 246, and the message node 248 in the virtual assistant builder UI 138, to create the "get weather" intent 240. The enterprise user may configure, by way of example, the intent node 242 using intent settings 242(1) and the entity node 244 using entity settings 244(1), user prompt settings 244(2), and error prompt settings 244(3). The enterprise user may provide: an intent name to the intent node 242 using the intent settings 242(1), an entity name and an entity type to the entity node 244 using the entity settings 244(1), user prompts to be sent to the end user when the VA server 110 executes the instructions corresponding to the entity node 244 using the entity user prompt settings 244(2), and error prompts to be sent to the end user when the VA server 110 is unable to recognize an end user response to the user prompt using the error prompt settings 244(3), although other types and/or numbers of settings may be added. The enterprise user may also associate one or more sub-intents with an intent, a group of intents, a node, or a group of nodes to configure the virtual assistant. The enterprise user may also configure the conditions when the one or more sub-intents should be identified by the VA server 110 and the virtual assistant behavior when the one or more sub-intents are identified by the VA server 110.

FIG. 3 is a block diagram of an example cloud computing environment 300 which may be used to implement the VA server 110. The cloud computing environment 300 may be communicatively coupled to one or more client devices 150(1)-150(n). One or more cloud computing nodes in the cloud computing environment 300 may include the VA server 110 or perform the functions of the VA server 110. Cloud computing is a computing model that enables convenient, on-demand network access to a shared pool of configurable computing resources, e.g., networks, servers, processing, storage, applications, and services, that can be provisioned and released rapidly, dynamically, and with minimal management efforts and/or interaction with a service provider. In examples, one or more aspects, functions and/or processes described herein may be performed and/or provided via the cloud computing environment 300. It may be understood that implementation of the examples disclosed herein are not limited to the cloud computing environment 300. Rather, examples of this technology are capable of being implemented in conjunction with any other type of computing environment now known or later developed.

As shown, the cloud computing environment 300 may be communicatively coupled with one or more cloud computing nodes, such as the one or more client devices 150(1)-150(n). The types of the one or more client devices 150(1)-150(n) shown in FIG. 3 are intended to be illustrative only and can communicate with any type of computerized device over any type of network and/or network addressable connection, by way of example, using a web browser. The one or more client devices 150(1)-150(n) may include a laptop computer, desktop computer, tablet, smartphone, and/or other computer system.

Each of the one or more client devices 150(1)-150(n) may include a processor, a memory, a user input device such as a keyboard, mouse, a display device, and/or a communication interface, which are coupled together by a bus or other link, although each may have other types and/or numbers of other systems, devices, components, and/or other elements. In examples, the cloud computing nodes may communicate with one another and may be grouped physically or virtually, in one or more networks, such as private, community, public, or hybrid clouds or a combination thereof. This allows the cloud computing environment 300 to offer infrastructure, platforms and/or software as services for which a cloud consumer does not need to maintain resources on a local computing device.

The cloud computing nodes can include a variety of hardware and/or software computing resources, such as servers, databases, storage, networks, applications, and platforms as shown, for example, in FIG. 1. Cloud resources may be on a single network or a distributed network across multiple cloud computing systems and/or individual network enabled computing devices. The cloud computing nodes may be configured, such that the cloud resources provide computing resources to the one or more client devices 150(1)-150(n) which may be user devices through a variety of service models, such as Software as a Service (SaaS), Platforms as a service (PaaS), Infrastructure as a Service (IaaS), and/or any other cloud service models. The cloud computing nodes may be configured, in some cases, to provide multiple service models to the one or more client devices 150(1)-150(n).

Figure 4:
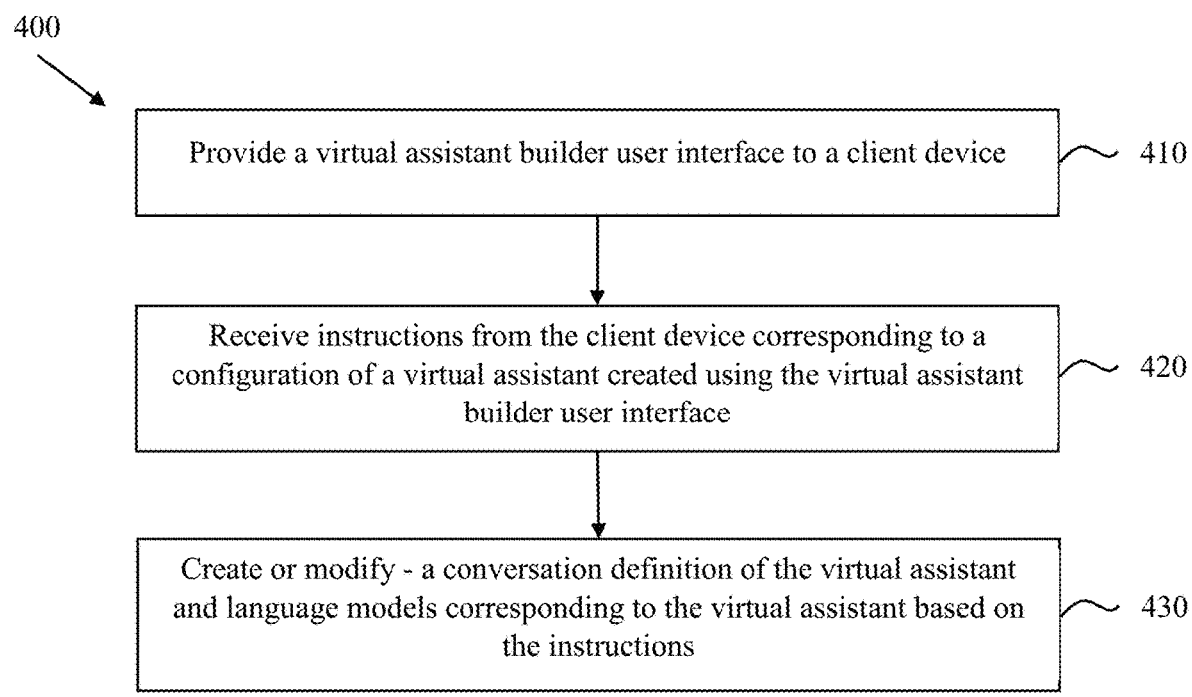
FIG. 4 is a flowchart of an example of a method for creating a conversation definition of a virtual assistant and language models corresponding to the virtual assistant.

FIG. 4 is a flowchart of an example of a method 400 for creating a conversation definition of the virtual assistant and language models corresponding to the virtual assistant. The method 400 may be performed by the VA server 110. The enterprise user may, for example, input a uniform resource locator (URL) such as <https://bots.kore.ai>, in a browser in the client device 150(n). The client device 150(n) generates a web request for content based on the URL. The VA server 110 receives the web request and in response, at step 410, the virtual assistant builder 128 of the VA sever 110 provides the virtual assistant builder UI 138 to the client device 150(n). The enterprise user may create a virtual assistant using multiple UI components provided by the virtual assistant builder UI 138. In one example, the virtual assistant builder UI 138 provides drag-and-drop methods to create the virtual assistant.

At step 420, the VA server 110 receives instructions, by way of example, from the client device 150(n) corresponding to a configuration of the virtual assistant created using the virtual assistant builder UI 138. The enterprise user may interact with the components of the virtual assistant builder UI 138 to configure the virtual assistant with: a) intents, nodes of each intents and transitions between the nodes, b) training utterances, sub-intents, synonyms, rules, patterns, entity types, state transitions, or state transition behaviors for each intent and node, although other types and/or numbers of configurations may be added, c) one or more groups of nodes and/or intents, and configure the groups with training utterances, sub-intents, synonyms, rules, patterns, entity types, state transitions, or state transition behaviors for each of the groups, d) interruption behaviors, e) channel configurations, although other types and/or numbers of configurations may be added. The configuration of the virtual assistant may also include the enterprise user adding: a virtual assistant name, an intent name, a sub-intent name, a node name, context information, variables, user prompts, or error handling settings, although other types and/or numbers of data, parameters or settings may be added in other configurations. The VA server 110 receives instructions from the client device 150(n) corresponding to the configuration of the virtual assistant.

At step 430, the VA server 110 creates or modifies—a conversation definition of the virtual assistant and language models (LM's) corresponding to the virtual assistant based on the instructions. In one example, when the enterprise user creates the travel virtual assistant 232 of FIG. 2B, the VA server 110 creates the travel virtual assistant conversation definition 130(1). When the enterprise user modifies the travel virtual assistant 232, the VA server 110 modifies the travel virtual assistant conversation definition 130(1).

The NLP engine 126 of the VA server 110 creates LM's corresponding to the virtual assistant. The NLP engine 126 may create a group of LM's comprising: one or more LM's of the virtual assistant used to classify an utterance into one of the intents of the virtual assistant, one or more LM's of each sub-intent defined in the virtual assistant, and one or more peripheral LM's of the virtual assistant including—small talk LM's or channel based LM's, although other types and/or numbers of LM's may be created. In some examples, the group of LM's may also include follow-up intents which executed when the execution of the conversation definition of a current intent is complete. For example, the "book cab" may be defined as a follow-up intent for a "book flight" intent. The enterprise user may associate a sub-intent with: a node, a group of nodes, an intent or a group of intents, thereby associating the one or more LM's of the sub-intent with the node, the group of nodes, the intent or the group of intents. In one example, the enterprise user may associate existing LM's or predefined LM's with the node, the group of nodes, the intent, or the group of intents.

By way of example, the group of LM's created by the VA server 110 based on the configuration of the travel virtual assistant 232 include—an LM of the travel virtual assistant 232 to classify an utterance into the "get weather" intent 240, "book train" intent 250, or "book flight" intent 260, one or more LM's of the "book lounge" sub-intent 262 and "change travel details" sub-intent 252, and one or more peripheral LM's of the travel virtual assistant 232 for the defined small talk. In some examples, at step 430, the VA server 110 may modify existing LM's corresponding to the virtual assistant based on the instructions.

The NLP engine 126 may create the group of LM's based on configuration including the training provided to the virtual assistant by the enterprise user. In one example, when machine learning training utterances (e.g., utterances provided by the enterprise user to train a machine learning model) are added to a new sub-intent, the machine learning driven engine 210 of the NLP engine 126 creates a machine learning LM of the new sub-intent. When machine learning training utterances are added to an existing sub-intent, the machine learning driven engine 210 of the NLP engine 126 modifies a machine learning LM of the existing sub-intent.

When patterns are added to a new sub-intent, the semantic rules driven engine 215 of the NLP engine 126 creates a semantic rules LM of the new sub-intent. When patterns are added to an existing sub-intent, the semantic rules driven engine 215 of the NLP engine 126 modifies the semantic rules LM of the existing sub-intent. When the configuration of the virtual assistant includes a knowledge graph and FAQ's corresponding to nodes in the knowledge graph, the NLP engine 126 may create a component relationship LM corresponding to the virtual assistant. The component relationship driven engine 220 enables the enterprise user to associate questions defined as part of a knowledge graph which may be matched when the execution of the conversation definition is at a specific node of an intent. When business rules are added to a new sub-intent, the business rules driven engine 225 of the NLP engine 126 creates a business rules LM of the new sub-intent. When rules are added to an existing sub-intent, the business rules driven engine 225 of the NLP engine 126 modifies the business rules LM of the existing sub-intent.

Global Language Models, Current-Node Language Models, and Peripheral Language Models Among the group of LM's created or modified, the VA server 110 may identify a first set of LM's comprising: current-node LM's, global LM's, or peripheral LM's to determine an intent of the utterance. When determining an intent of an utterance, the VA server 110 may identify the current-node LM's based on the current-node executed by the VA server 110. The current-node LM's may include: one or more LM's associated with the current-node, one or more LM's associated with a current-node intent, one or more LM's associated with the group of nodes that the current-node is a part of, or one or more LM's associated with the group of intents that the current-node intent is a part of, or a combination of two or more of these. The current-node intent is the intent which the current-node is a part of By way of example illustrated in screen 550 of FIG. 5, when the current-node of the conversation is a "destination" entity node, the current node LM's include the one or more LM's associated with the group of nodes—cities 552.

The global LM's and the peripheral LM's are based on the configuration of the virtual assistant. The global LM's include: one or more LM's of the virtual assistant used to classify an utterance into one of the intents of the virtual assistant. For the travel virtual assistant 232, the global LM's include: an LM of the travel virtual assistant 232 to classify an utterance into the "get weather" intent 240, the "book train" intent 250, or the "book flight" intent 260. The peripheral LM's include: a small talk model LM, a channel-based LM, although the peripheral LM's may include other types and/or numbers of LM's. For the travel virtual assistant 232, the peripheral LM's include a small talk LM.

It may be understood that the current-node LM's may be different based on the current-node of the conversation and the configuration of the virtual assistant. In some examples the enterprise user, when configuring the virtual assistant, may have associated a sub-intent with the current-node intent, but may not have associated any sub-intents with a node, and may not have created a group of nodes or a group of intents. Here, the current-node LM's, when the execution of the intent is at the node, may only include the one or more LM's of the current-node intent. In other examples, when configuring the virtual assistant, the enterprise user may have associated a sub-intent with the current-node, but may not have associated any sub-intents with a current-node intent, and may not have created a group of nodes or a group of intents. Here, the current-node LM's may include the one or more LM's of the current-node.

Figure 5:
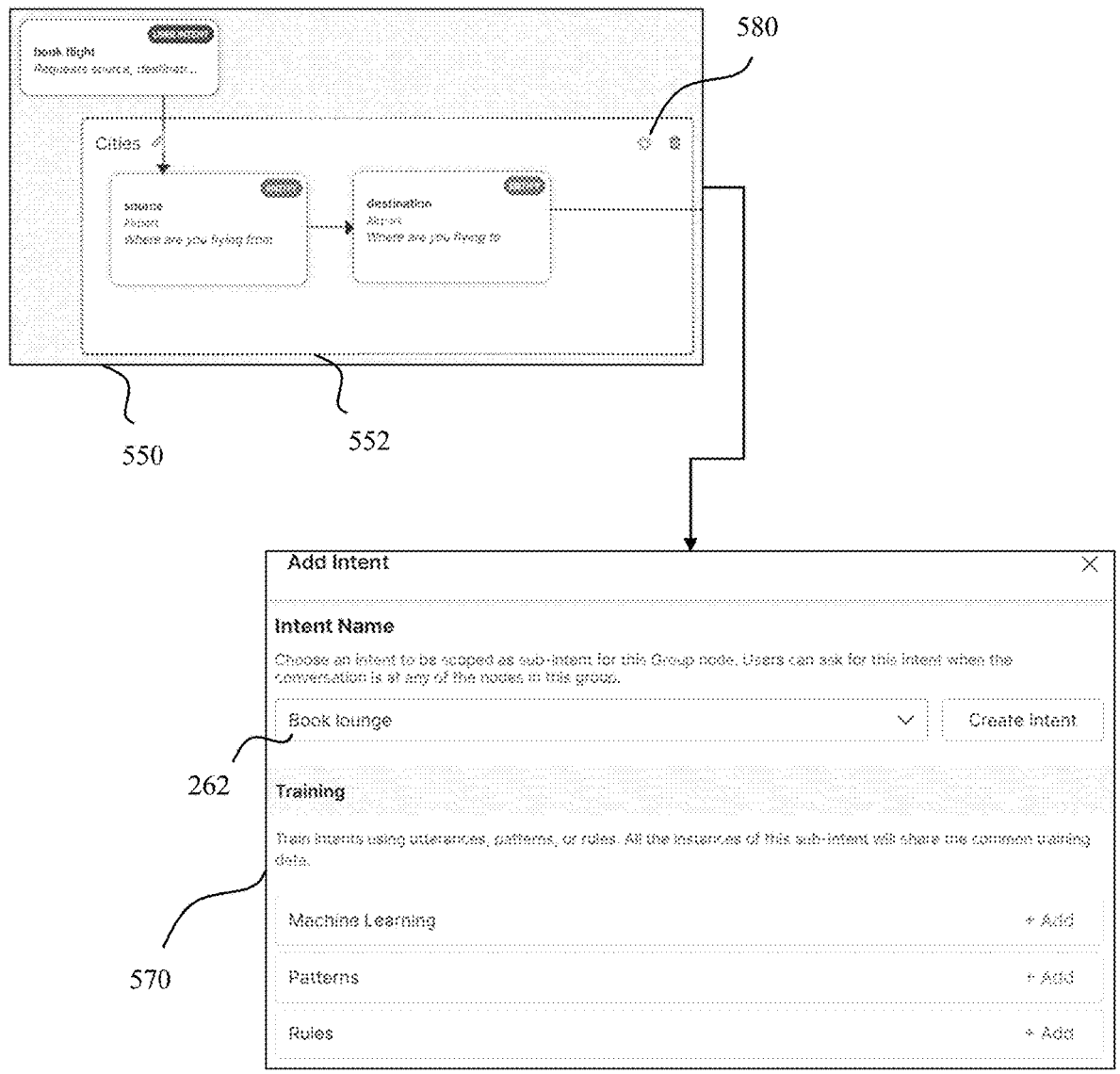
FIG. 5 illustrates screenshots of an example configuration including a sub-intent associated with a group of nodes of a book flight intent of the travel virtual assistant.

FIG. 5 illustrates screenshots of an example configuration including a sub-intent associated with a group of nodes of the "book flight" intent 260 of the travel virtual assistant 232. A screenshot 550 includes a selection of a group of nodes by the enterprise user using the virtual assistant builder UI 138. The group of nodes may be named—cities 552 by the enterprise user. The enterprise user may define settings 580 of cities 552 in the virtual assistant builder UI 138. The enterprise user may associate a sub-intent with cities 552 by selecting the settings 580 of cities 552 and associating an existing sub-intent or a new sub-intent with cities 552 as illustrated in a screenshot 570. The enterprise user may also select a node of an intent and associate an existing sub-intent or a new sub-intent with the node as illustrated in the screenshot 570. In this example, a—"book lounge" sub-intent 262 may be defined and associated with cities 552. When the "book lounge" sub-intent 262 is associated with cities 552, the VA server 110 may associate one or more LM's of the "book lounge" sub-intent 262 with cities 552. As a result, the one or more LM's of the group of nodes—cities 552 includes one or more LM's of the "book lounge" sub-intent 262.

The enterprise user may also provide training to the existing sub-intent or the new sub-intent by adding machine learning utterances, patterns, or rules as illustrated in the screenshot 570, although other methods of training may be provided. Based on the training provided to the intent or the sub-intent, at step 430, the NLP engine 126 may create or modify one or more LM's. Referring to the screenshot 570, when the training includes machine learning utterances, the NLP engine 126 creates a machine learning LM of the "book lounge" sub-intent 262. When the training includes patterns, the NLP engine 126 creates a semantic rules LM of the "book lounge" sub-intent 262. When the training includes rules, the NLP engine creates a business rules LM of the "book lounge" sub-intent 262.

The client device 150(n) outputs instructions corresponding to the interactions performed in the virtual assistant builder UI 138, for example, associating a sub-intent with the group of nodes—cities 552, or adding training data to the sub-intent, or the like. The VA server 110 receives the instructions corresponding to the interactions from the client device 150(n) and creates or modifies the conversation definition of the virtual assistant and language models corresponding to the virtual assistant based on the instructions, as described in step 420 and step 430 of FIG. 4.

The NLP engine 126 of the VA server 110 creates one or more LM's corresponding to cities 552 based on the addition of the existing sub-intent or the new sub-intent and the training added to the existing sub-intent or the new sub-intent. In the example illustrated in FIG. 5, the "book lounge" sub-intent 262 is associated with cities 552 which includes a "source" entity node and a "destination" entity node. The NLP engine 126 creates one or more LM's of the "book lounge" sub-intent 262. In one example, when the current-node of the conversation is one of the "source" entity node or the "destination" entity node, and the VA server 110 receives an utterance, the VA server 110 matches the utterance first with the one or more LM's of the "book lounge" sub-intent 262. When the current-node of the conversation is not one of the "source" entity node or the "destination" entity node, and the VA server 110 receives an utterance, the VA server 110 may not initially match the utterance with the one or more LM's of the "book lounge" sub-intent 262. By prioritizing the execution of the current-node LM's over the global LM's or the peripheral LM's, the VA server 110 improves the utterance understanding, response accuracy, end user satisfaction, end user experience, and reduces the number of volleys required to fulfill intents. The prioritization of the current-node LM's also advantageously reduces the processing power and memory required to execute the conversation.

Figure 6:
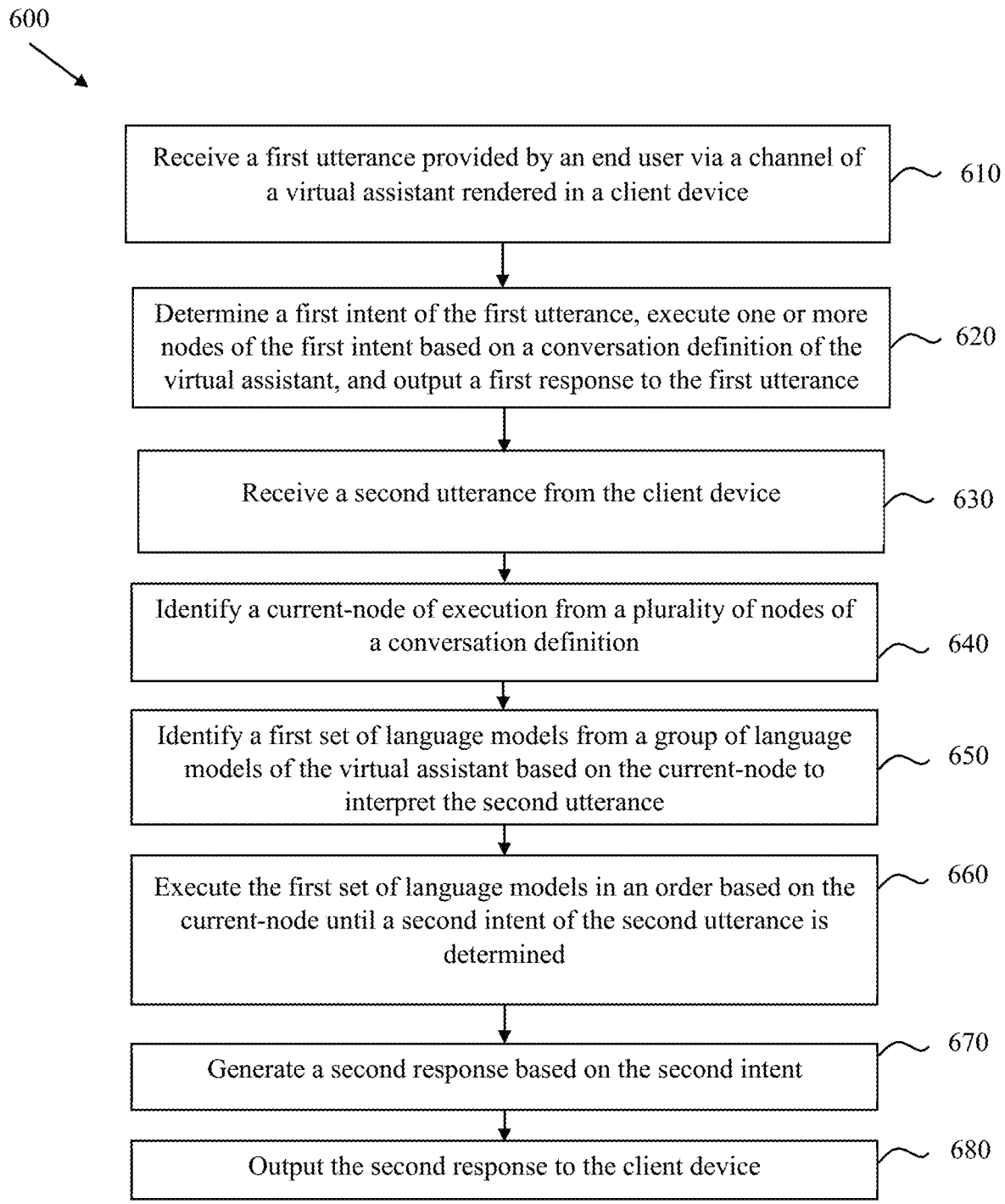
FIG. 6 is a flowchart of an example of a method of the virtual assistant server configured to orchestrate natural language conversations.

FIG. 6 is a flowchart of an example of a method of the VA server 110 configured to orchestrate natural language conversations. The steps in the method 600 may be performed by the VA server 110. The method 600 begins at step 610, when the VA server 110 receives a first utterance provided by an end user via a channel of a virtual assistant rendered in a client device 150(1) as part of the conversation with the end user. In one example, the end user using a chat channel in the client device 150(1) may be in a conversation with the travel virtual assistant 232.

Figure 7A:
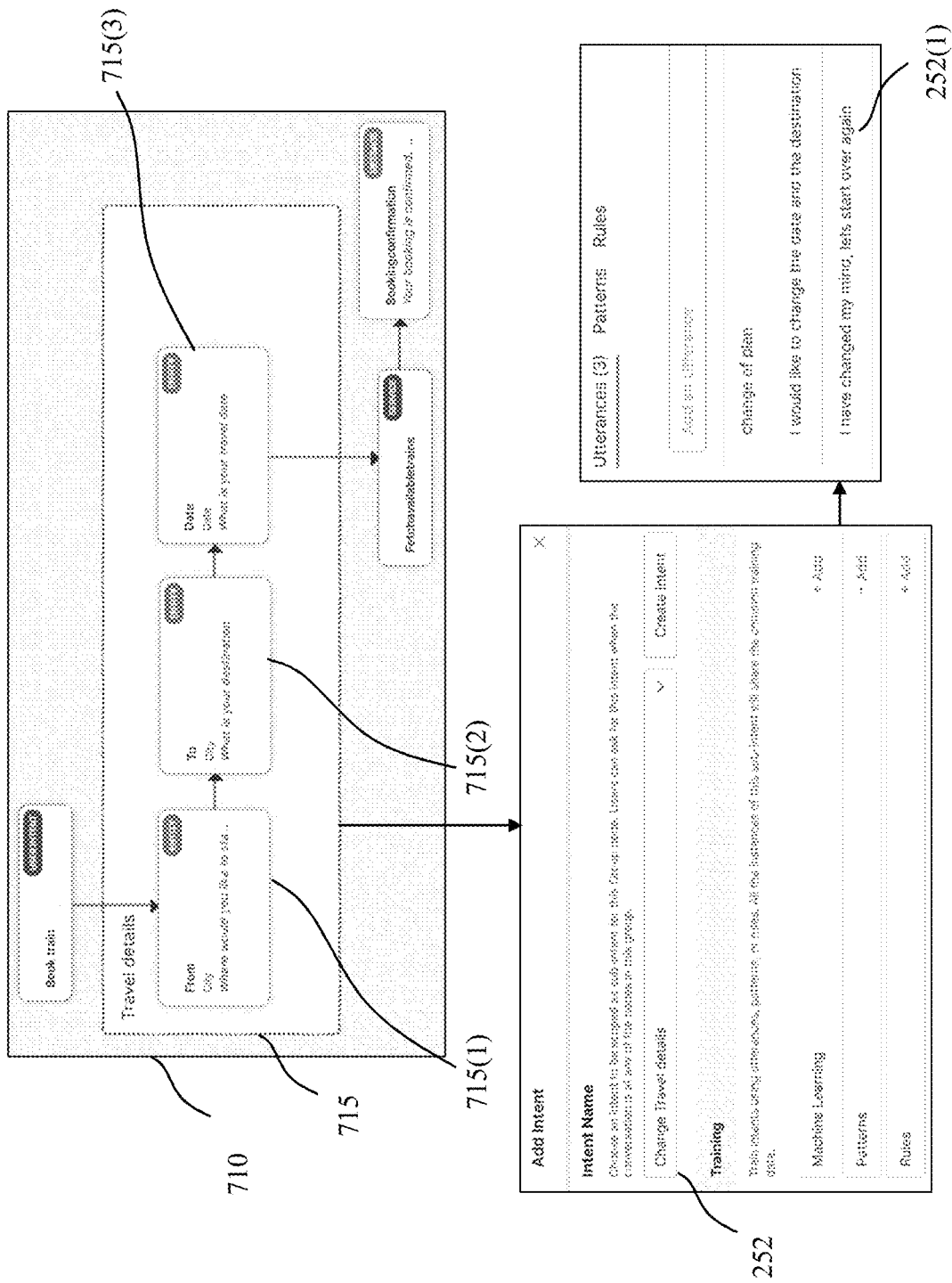
FIG. 7A illustrates a screenshot of an example configuration of the book train intent of the travel virtual assistant.

At step 620, the VA server 110 determines a first intent of the first utterance, executes one or more nodes of the first intent based on a conversation definition of the virtual assistant, and outputs a first response to the first utterance. In one example, the NLP engine 126 of the VA server 110 may execute the global LM's of the travel virtual assistant 232 to interpret the first utterance and determine the first intent of the first utterance. The VA server 110 may determine that the first intent of the first utterance is "book train" 250. FIG. 7A illustrates a screenshot 710 of an example configuration of the "book train" 250 intent of the travel virtual assistant 232. In this example, the enterprise user configures a group of nodes of the "book train" intent 250 with the name—travel details 715. The enterprise user creates a "change travel details" sub-intent 252 and trains the "change travel details" sub-intent 252 with three machine learning utterances 252(1). Further, the enterprise user associates the travel details 715 group of nodes with the "change travel details" sub-intent 252. As a result, the VA server 110 associates the one or more LM's of the "change travel details" sub-intent 252 with the travel details 715 group of nodes. As the training for the "change travel details" sub-intent 252 includes only machine learning utterances, the one or more LM's of the "change travel details" sub-intent 252 includes a machine learning LM.

After the "book train" intent 250 is determined, the VA server 110 executes instructions of the TCD 130(1), specifically the instructions corresponding to the "book train" intent 250 of the TCD 130(1) and transitions to the instructions corresponding to a "from" entity node 715(1) and subsequently to a "to" entity node 715(2) in the travel details 745 group of nodes. The travel virtual assistant 232 responds to the first utterance with an entity prompt of the "from" entity node 715(1). The end user in response to the entity prompt provides the value corresponding to the "from" entity node 715(1). Subsequently, the VA server 110 provides the entity prompt of the "to" entity node 715(2) to the end user. The end user in response to the entity prompt of the "to" entity node 715(2), provides the value corresponding to the "to" entity node 715(2).

At step 630, the VA server 110 receives a second utterance from the client device 150(1) via the chat channel as part of the conversation. It may be understood that the end user may provide the utterances in a textual mode or in a voice mode using any of the virtual assistant channels, such as SMS, email, web/mobile client, webhook, Live Person, Microsoft teams, Kore.ai Messenger, Skype for Business, WhatsApp Business Messaging, Slack, Facebook Messenger, Telegram, Twitter, Amazon Alexa, Interactive voice response server (IVR), IVR—Audio codes, or the like. Also, the nomenclature—the first utterance, the second utterance is merely used for representational purposes. For example, the end user when conversing with the travel virtual assistant 232 may provide an utterance "Hi", and after the travel virtual assistant 232 responds with "Hello, how can I help you", provide another utterance "I would like to book train tickets". In this example, the utterance "I would like to book train tickets", may be the first utterance.

In one example, when the conversation is in the voice mode, conversation intermediaries, such as a speech-to-text (STT) engine and/or a text-to-speech (TTS) engine by way of example, may provide conversation mode conversion from speech-to-text and from text-to-speech. The STT engine converts the voice utterance from the client device 150(1) to text and transmits the text to the VA server 110. The TTS engine converts the textual utterance from the VA server 110 to voice and transmits the voice to the client device 150(1).

At step 640, the VA server 110 identifies a current-node of execution from a plurality of nodes of the conversation definition. In this example, the VA server 110 identifies that the current-node of the conversation as the "date" entity node 715(3) of the "book train" intent 250 from the plurality of nodes of the TCD 130(1). The TCD 130(1) includes metadata and instructions corresponding to the "book train" intent 250 and the information corresponding to the nodes of the "book train" intent 250 illustrated in the screen 710.

At step 650, the VA server 110 identifies a first set of LM's from a group of LM's of the virtual assistant based on the current-node to interpret the second utterance. Among the group of LM's created by the VA server 110, the VA server 110 identifies the first set of LM's comprising: the current-node LM's, the global LM's, and the peripheral LM's to interpret the second utterance. In this example, as the current-node of the conversation is the "date" entity node 715(3), the VA server 110 identifies: the current-node LM's as the one or more LM's associated with the group of nodes—travel details 715, the global LM's as the one or more LM's of the travel virtual assistant 232, and the peripheral LM as the small talk LM.

At step 660, the VA server 110 executes the first set LM's identified at step 650 to interpret the second utterance in an order based on the current-node until a second intent of the second utterance is determined. In one example, NLP engine 126 of the VA server 110 executes the first set of LM's to interpret the second utterance in an order based on the current-node until one of the engines 210, 215, 220, or 225 of the NLP engine 126 outputs a second intent of the second utterance as a definitive match. If none of the engines 210, 215, 220, or 225 of the NLP engine 126 output a definitive match and two or more engines 210, 215, 220, or 225 of the NLP engine 126 output different intents as possible matches, the NLP engine 126 provides the outputs of the two or more engines 210, 215, 220, or 225 to the resolver 230 which determines and outputs the second intent (e.g. the final winning intent) of the second utterance.

The VA server 110 determines an order of execution of the first set of LM's to interpret the second utterance. FIG. 7B illustrates a table 740 including an example order 750 of execution of the first set of LM's identified by the VA server 110 to interpret the second utterance. In this example, in the first set of LM's, the VA server 110 may initially execute the current-node LM's, subsequently execute the global LM's, and then subsequently execute the peripheral LM's. Further, the order 750 may also include the order of execution of the current-node LM's. For example, the order 750 of execution of the current-node LM's may be: 1) the one or more LM's associated with the current-node, 2) the one or more LM's associated with the group of nodes that the current-node is a part of, 3) the one or more LM's associated with the current-node intent, and 4) the one or more LM's associated with the group of intents that the current-node intent is a part of.

When two or more engines 210, 215, 220, or 225 of the NLP engine 126 interpret the utterance and output intents (e.g. intent names or sub-intent names) categorized as possible matches, the resolver 230 may identify a final winning intent from the output intents. In one example, when the machine learning engine 210 interprets the utterance using a machine learning LM of the "change travel details" sub-intent 252 and outputs a possible match with the utterance, and the semantic rules driven engine 215 interprets the utterance using a semantic rules LM of the "book flight" intent 260 and also outputs a possible match with the utterance, the NLP engine 126 may output the intents (e.g. possible matches—"change travel details", "book flight") of the machine learning engine 210 and the semantic rules driven engine 215 to the resolver 230. The resolver 230 determines a final winning intent as either the "change travel details" sub-intent 252 or the "book flight" intent 260. The usage of multiple engines by the VA server 110 improves the accuracy of intent and reduces the need to provide extensive training to the virtual assistants.

In one example, the VA server 110 may determine the above-mentioned order 750 of execution when execution of the conversation definition is at a node level. When the VA server 110 executes instructions of a conversation definition corresponding to a node within an intent created in the virtual assistant, the execution of the conversation definition is at the node level. For example, when the VA server 110 executes the TCD 130(1), and when the VA server 110 executes instructions of the TCD 130(1) corresponding to the "date" entity node 715(3), the VA server 110 stores the current-node as the "date" entity node 715(3), and the execution of the TCD 130(1) is at the node level.

In another example, the end user operating the client device 150(1) may be in a conversation with the travel virtual assistant 232 using a chat channel. In the conversation, the end user may input an utterance—"Hi". The VA server 110 may execute the small talk LM to interpret the utterance and responds with—"Hi, How can I help you". In this example, the VA server 110 may have executed the global LM's and not have found an intent of the utterance and as a result executes the small talk LM. Subsequently, the end user may provide another utterance as—"I would like to book flight tickets"—whose intent may be determined by the VA server 110 as—"book flight" intent 260, by executing the global LM's of the travel virtual assistant 232. Subsequently, the VA server 110 starts executing instructions of the TCD 130(1) corresponding to the "book flight" intent 260. When executing the instructions corresponding to the "book flight" intent 260 and when the current-node of execution is the "source" entity node, the VA server 110 outputs using the TCD 130(1), the user prompt defined in the "source" entity node to the end user. When the instructions of the TCD 130(1) corresponding to "source" entity node are executed, the VA server 110 stores the current-node as the "source" entity node, and the execution of the TCD 130(1) is at the node level.

When the VA server 110 is not executing instructions corresponding to a node of an intent of a virtual assistant, the execution of the conversation definition is not at the node level. When the execution of the conversation definition is not at the node level, the first set of LM's may only include the global LM's and the peripheral LM's and the VA server 110 may determine an order 750 of execution of the global LM's and the peripheral LM's, and execute the global LM's and the peripheral LM's in the order 750 to determine an intent of an utterance.

Referring back to FIG. 6, at step 660 after the VA server 110 determines, among the group of LM's created by the VA server 110, the order 750 of execution of the first set of LM's, the VA server 110 executes the first set of LM's in the determined order 750 to interpret the second utterance until one of the first set of LM's determines the second intent of the second utterance. In the example illustrated in FIG. 7A, when the current-node of execution is the "date" entity node 715(3), the VA server 110 executes the first set of LM's in the determined order 750. The determined order 750 in this example may be: 1) the current-node LM's: the one or more LM's associated with the group of nodes—travel details 715 and 2) the global LM's: the one or more LM's of the travel virtual assistant 232, and the one or more peripheral LM's of the travel virtual assistant 232, until the VA server 110 using one of the current-node LM's, global LM's or the peripheral LM's determines the second intent of the second utterance. In one example, if the VA server 110 using the machine learning LM associated with the group of nodes—travel details 715 determines the second intent of the second utterance, then the VA server 110 does not execute the other current-node LM's, the global LM's, or the peripheral LM's.

The VA server 110 during the execution of the first set of LM's, provides the second utterance as an input to the current-node LM's, the global LM's, and the peripheral LM's in the determined order 750 until the second intent is determined. It may be understood that, in some examples, none of the first set of LM's may determine the second intent of the second utterance, and in such examples, the VA server 110 may respond with an error message. In the order 750, the first set of LM's may be executed in a hierarchical manner. In one example, in the order 750, the hierarchical manner of execution of the first set of LM's may be 1.a, 1.b, 1.c, 1.d, 2, and 3. The engines 210, 215, 220, or 225 of the NLP engine 126 after executing one or more of the current-node LM's, the global LM's, and the peripheral LM's may output—whether the second intent is determined (e.g. second intent name), the confidence score and the match type, such as a definitive match or a possible match by way of example, although other types and/or numbers of outputs may be provided in other configurations.

After the second intent of the second utterance is determined, at step 670, the VA server 110, generates a second response based on the second intent of the second utterance. At step 680, the VA server 110 outputs the second response to the client device 150(1).

Figure 7C:
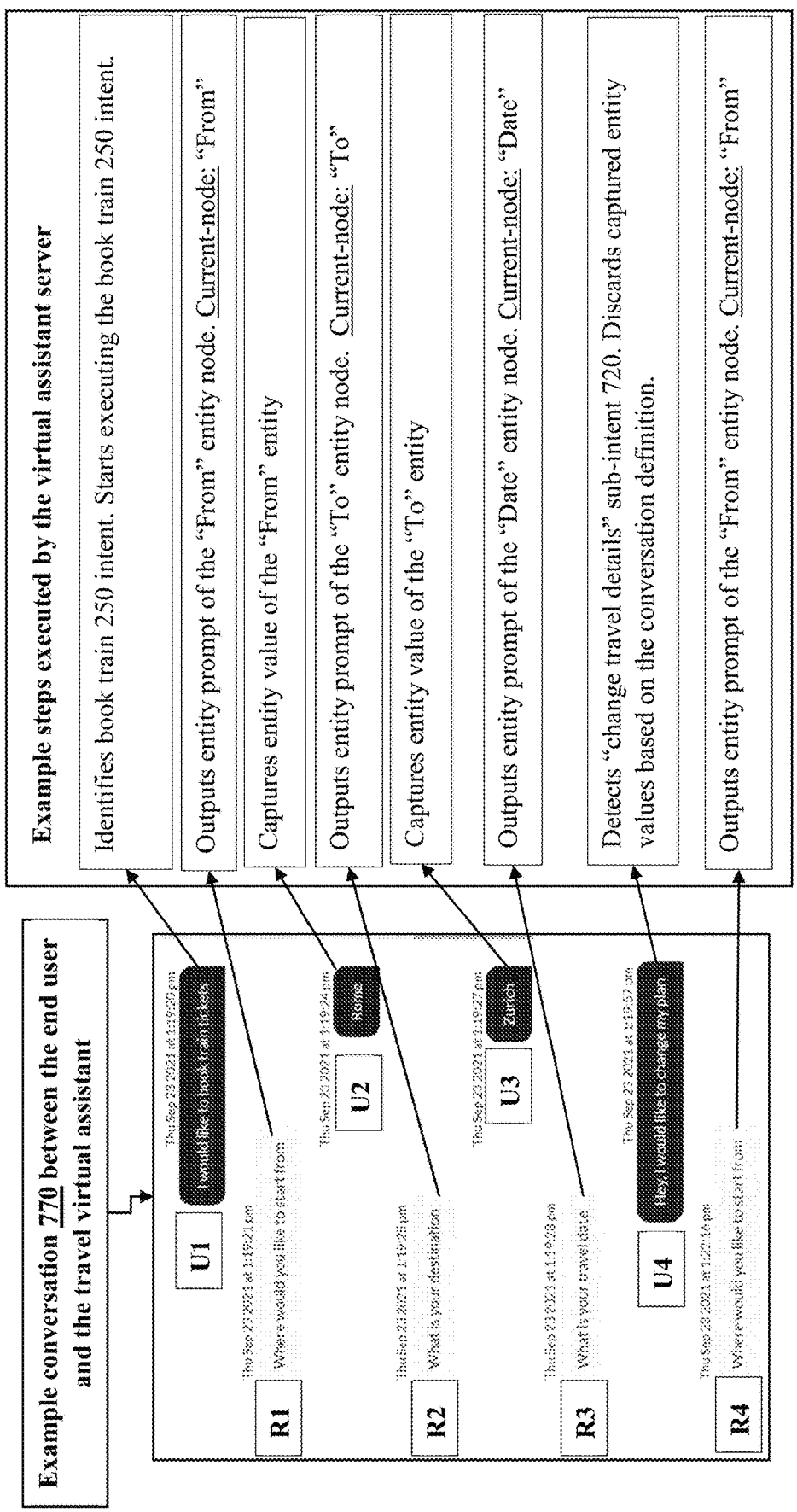
FIG. 7C illustrates an example conversation between the end user and the travel virtual assistant and example steps executed by the virtual assistant server to orchestrate the example conversation.

FIG. 7C illustrates an example conversation 770 between the end user and the travel virtual assistant 232 and example steps executed by the VA server 110 to orchestrate the example conversation 770. For ease of understanding and representational purposes, the utterances provided by the end user are represented as U1-U4, and the responses provided by the VA server 110 to the utterances are represented as R1-R4. The example conversation 770 begins at U1 when the VA server 110 identifies the intent of U1 as book train 250 and starts executing the TCD 130(1), in particular the instructions of the TCD 130(1) corresponding to the "book train" 250 intent. The VA server 110 executes the instructions of TCD 130(1) corresponding to the "From" entity node 715(1) and the VA server 110 outputs R1—which is an entity prompt of the "From" entity node 715(1). The end user responds to R1 with U2 and provides an entity value to the "From" entity node 715(1). Based on TCD 130(1), the VA server 110 executes the instructions of TCD 130(1) corresponding to the "To" entity node 715(2) and the VA server 110 outputs R2—which is an entity prompt of the "To" entity node 715(2). The end user responds to R2 with U3 and provides an entity value to the "To" entity node 715(2). Based on TCD 130(1), the VA server 110 executes the instructions of TCD 130(1) corresponding to the "date" entity node 715(3) and the VA server 110 outputs R3—which is an entity prompt of the "date" entity node 715(3).

The end user responds to R3 with U4. The VA server 110 determines that U4 does not correspond to an entity value of "date" entity node 715(3), and the VA server 110 determines the intent of U4 by identifying the first set of LM's when the current-node is "date" entity node 715(3), and by executing a first set of LM's including the current-node LM's, global LM's and the peripheral LM's in the determined order 750. The determined order 750 in this example may be: 1) the current-node LM's: the one or more LM's associated with the group of nodes—travel details 715, 2) the global LM's: the one or more LM's of the travel virtual assistant 232 and the one or more peripheral LM's of the travel virtual assistant 232, until one of the current-node LM's, the global LM's, or the peripheral LM's determines the intent of U4. The VA server 110 executes the one or more LM's associated with the travel details 715 group of nodes—which is a machine learning LM of the "change travel details" sub-intent 252 created based on the three training utterances 252(1). The machine learning driven engine 210 may provide U4 to the machine learning LM, and based on a definitive intent match determined by the machine learning driven engine 210, the VA server 110 may determine that the intent of U4 is the "change travel details" sub-intent 252. When the intent of U4 is determined as—"change travel details" sub-intent 252, TCD 130(1) may have been configured to discard the entity values captured and execute instructions corresponding to the "From" entity node 715(1). Based on the TCD 130(1), the VA server 110 may discard the entity values captured at U2, U3, and output R1—which is an entity prompt of the "From" entity node 715(1). In this example, by executing the first set of LM's in the order 750, the VA server 110 prioritizes current-node LM's and determines the intent of the end user utterances contextually, based on what the end user may ask at specific points in the example conversation 770, thus advantageously expediting the determination of the intent of U4, and orchestrating the example conversation 770 to the satisfaction of the end user.

Having thus described the basic concept of the invention, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations therefore, is not intended to limit the claimed processes to any order except as may be specified in the claims. Accordingly, the invention is limited only by the following claims and equivalents thereto.

What is claimed is:

1. A natural language processing method comprising:
receiving, by a virtual assistant server, an utterance provided by an end user via a channel of a virtual assistant rendered in a client device;
identifying, by the virtual assistant server, a current-node of execution from a plurality of nodes of a conversation definition of the virtual assistant;
identifying, by the virtual assistant server, a first set of language models from a group of language models of the virtual assistant based on the current-node to interpret the utterance;
executing, by the virtual assistant server, the first set of language models in an order based on the current-node until an intent of the utterance is determined;
generating, by the virtual assistant server, a response based on the intent; and
outputting, by the virtual assistant server, the response to the client device.

2. The method of claim 1, wherein the first set of language models comprise one or more current-node language models or one or more global language models.

3. The method of claim 2, further comprising determining the order by prioritizing the one or more current-node language models over the one or more global language models, when an execution of the conversation definition is at a node level.

4. The method of claim 2, further comprising determining the order by prioritizing the one or more global language models over the one or more current-node language models when an execution of the conversation definition is not at a node level.

5. The method of claim 2, wherein the one or more current-node language models comprise: a first language model associated with the current-node, a second language model associated with a group of nodes including the current-node, a third language model associated with a current-node intent, or a fourth language model associated with a group of intents including the current-node intent.

6. The method of claim 2, wherein the one or more global language models comprise one or more language models of the virtual assistant.

7. The method of claim 1, further comprising:
creating, by the virtual assistant server, the group of language models based on training provided to the virtual assistant.

8. A virtual assistant server comprising:

a processor; and a memory coupled to the processor which is configured to be capable of executing programmed instructions stored in the memory to:
- receive an utterance provided by an end user via a channel of a virtual assistant rendered in a client device;
- identify a current-node of execution from a plurality of nodes of a conversation definition of the virtual assistant;
- identify a first set of language models from a group of language models of the virtual assistant based on the current-node to interpret the utterance;
- execute the first set of language models in an order based on the current-node until an intent of the utterance is determined;
- generate a response based on the intent; and
- output the response to the client device.

9. The virtual assistant server of claim 8, wherein the first set of language models comprise one or more current-node language models or one or more global language models.

10. The virtual assistant server of claim 9, wherein the processor is further configured to determine the order by prioritizing the one or more current-node language models over the one or more global language models, when an execution of the conversation definition is at a node level.

11. The virtual assistant server of claim 9, wherein the processor is further configured to determine the order by prioritizing the one or more global language models over the one or more current-node language models when an execution of the conversation definition is not at a node level.

12. The virtual assistant server of claim 9, wherein the one or more current-node language models comprise: a first language model associated with the current-node, a second language model associated with a group of nodes including the current-node, a third language model associated with a current-node intent, or a fourth language model associated with a group of intents including the current-node intent.

13. The virtual assistant server of claim 8, wherein the one or more global language models comprise one or more language models of the virtual assistant.

14. The virtual assistant server of claim 8, wherein the processor is further configured to create the group of language models based on training provided to the virtual assistant.

15. A non-transitory computer-readable medium having stored thereon instructions for enabling and orchestrating enterprise automation which when executed by a processor, causes the processor to:
- receive an utterance provided by an end user via a channel of a virtual assistant rendered in a client device;
- identify a current-node of execution from a plurality of nodes of a conversation definition of the virtual assistant;
- identify a first set of language models from a group of language models of the virtual assistant based on the current-node to interpret the utterance;
- execute the first set of language models in an order based on the current-node until an intent of the utterance is determined;
- generate a response based on the intent; and
- output the response to the client device.

16. The non-transitory computer-readable medium of claim 15, wherein the first set of language models comprise one or more current-node language models or one or more global language models.

17. The non-transitory computer-readable medium of claim 16, wherein the executable instructions when executed by the processor further causes the processor to: determine the order by prioritizing the one or more current-node language models over the one or more global language models, when an execution of the conversation definition is at a node level.

18. The non-transitory computer-readable medium of claim 16, wherein the executable instructions when executed by the processor further causes processor to: determine the order by prioritizing the one or more global language models over the one or more current-node language models when an execution of the conversation definition is not at a node level.

19. The non-transitory computer-readable medium of claim 16, wherein the one or more current-node language models comprise: a first language model associated with the current-node, a second language model associated with a group of nodes including the current-node, a third language model associated with a current-node intent, or a fourth language model associated with a group of intents including the current-node intent.

20. The non-transitory computer-readable medium of claim 15, wherein the one or more global language models comprise one or more language models of the virtual assistant.

21. The non-transitory computer-readable medium of claim 15, wherein the executable instructions when executed by the processor further causes processor to create the group of language models based on training provided to the virtual assistant.

* * * * *